United States Patent
Sato et al.

(10) Patent No.: US 9,912,099 B2
(45) Date of Patent: Mar. 6, 2018

(54) TERMINAL-ATTACHED ELECTRIC WIRE

(71) Applicants: YAZAKI CORPORATION, Tokyo (JP); TOYOTA JIDOSHA KABUSHIKI KAISHA, Toyota-shi, Aichi-ken (JP)

(72) Inventors: Kei Sato, Makinohara (JP); Hiroshi Aoki, Makinohara (JP); Takahito Nakashima, Toyota (JP); Hiroshi Kobayashi, Toyota (JP); Hiroyasu Taga, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/033,372

(22) PCT Filed: Oct. 17, 2014

(86) PCT No.: PCT/JP2014/077736
§ 371 (c)(1),
(2) Date: Apr. 29, 2016

(87) PCT Pub. No.: WO2015/076043
PCT Pub. Date: May 28, 2015

(65) Prior Publication Data
US 2016/0276777 A1    Sep. 22, 2016

(30) Foreign Application Priority Data

Nov. 19, 2013  (JP) ................. 2013-238419

(51) Int. Cl.
*H01R 13/58* (2006.01)
*H01R 4/70* (2006.01)
(Continued)

(52) U.S. Cl.
CPC ..... *H01R 13/5845* (2013.01); *B29C 45/0025* (2013.01); *H01R 4/18* (2013.01);
(Continued)

(58) Field of Classification Search
CPC .................. H01R 13/405; H01R 13/5845
(Continued)

(56) References Cited

U.S. PATENT DOCUMENTS 3,055,967 A    9/1962  Bondon
3,749,813 A    7/1973  Shealy
(Continued)

FOREIGN PATENT DOCUMENTS

CN    201556718 U    8/2010
CN    103229359 A    7/2013
(Continued)

OTHER PUBLICATIONS

International Search Report, issued by International Searching Authority in corresponding International Application No. PCT/JP2014/077736, dated Dec. 22, 2014. (PCT/ISA/210).
(Continued)

*Primary Examiner* — Tulsidas C Patel
*Assistant Examiner* — Marcus Harcum
(74) *Attorney, Agent, or Firm* — Sughrue Mion, PLLC

(57) ABSTRACT

In a terminal-attached electric wire (1), a resin portion (4) which covers a conductor-exposed portion of a terminal (3) to which a conductor is connected is formed by molding resin in the conductor-exposed portion. In the terminal-attached electric wire (1), the resin portion (4) has a peeling preventive portion (14) which prevents the resin portion (4) from peeing off in a release direction of a die when the die is released.

2 Claims, 13 Drawing Sheets

(51) Int. Cl.
*H01R 43/24* (2006.01)
*B29C 45/00* (2006.01)
*H01R 4/18* (2006.01)
*H01R 4/62* (2006.01)
*B29C 45/14* (2006.01)

(52) U.S. Cl.
CPC ............... *H01R 4/70* (2013.01); *H01R 43/24* (2013.01); *B29C 45/14418* (2013.01); *B29C 45/14549* (2013.01); *B29C 45/14639* (2013.01); *H01R 4/62* (2013.01)

(58) Field of Classification Search
USPC .................................................. 439/877, 736
See application file for complete search history.

(56) References Cited

U.S. PATENT DOCUMENTS

| | | | | |
|---|---|---|---|---|
| 7,731,531 | B2* | 6/2010 | Tsujino | H01R 4/029 |
| | | | | 29/858 |
| 8,771,015 | B2* | 7/2014 | Inoue | H01R 4/70 |
| | | | | 439/604 |
| 8,927,863 | B2* | 1/2015 | Tanikawa | H02G 15/04 |
| | | | | 174/74 A |
| 8,951,063 | B2* | 2/2015 | Iio | H01R 13/5216 |
| | | | | 439/523 |
| 2001/0003687 | A1 | 6/2001 | Kondo | |
| 2001/0003688 | A1* | 6/2001 | Kondo | B29C 45/14426 |
| | | | | 439/604 |
| 2002/0027013 | A1 | 3/2002 | Kondo | |
| 2002/0053458 | A1 | 5/2002 | Kondo | |
| 2003/0119351 | A1 | 6/2003 | Miyazaki et al. | |
| 2004/0253871 | A1 | 12/2004 | Sakatani | |
| 2011/0070770 | A1* | 3/2011 | Sakai | H01R 4/70 |
| | | | | 439/521 |
| 2013/0098679 | A1* | 4/2013 | Takata | C08L 23/26 |
| | | | | 174/74 R |
| 2013/0199842 | A1* | 8/2013 | Inoue | H01R 4/62 |
| | | | | 174/84 C |
| 2013/0213709 | A1* | 8/2013 | Kawamura | H01R 4/183 |
| | | | | 174/72 A |
| 2013/0252459 | A1 | 9/2013 | Tanaka et al. | |
| 2015/0132993 | A1 | 5/2015 | Osada et al. | |
| 2016/0156113 | A1 | 6/2016 | Tanaka et al. | |

FOREIGN PATENT DOCUMENTS

| | | |
|---|---|---|
| DE | 10261264 A1 | 7/2003 |
| DE | 102004027947 A1 | 2/2005 |
| JP | 4-154056 A | 5/1992 |
| JP | 11-164887 A | 6/1999 |
| JP | 2000-167870 A | 6/2000 |
| JP | 2001-162647 A | 6/2001 |
| JP | 2001-167821 A | 6/2001 |
| JP | 2006231939 A | 9/2006 |
| JP | 2012-129178 A | 7/2012 |
| JP | 2013222637 A | 10/2013 |
| JP | 2014091383 A | 5/2014 |
| WO | 2014/017614 A1 | 1/2014 |

OTHER PUBLICATIONS

Written Opinion, issued by International Searching Authority in corresponding International Application No. PCT/JP2014/077736, dated Dec. 22, 2014. (PCT/ISA/237).
Translation of Written Opinion dated Dec. 22, 2014, issued by International Searching Authority in corresponding International Application No. PCT/JP2014/077736, which was cited in an IDS on Apr. 29, 2016. (PCT/ISA/237).
Office Action dated Jul. 5, 2017 by the State Intellectual Property Office of P.R. China in counterpart Chinese Patent Application No. 201480063267.3.
Communication dated Sep. 5, 2017, from the Japanese Patent Office in counterpart application No. 2015-177229.
Communication dated Sep. 28, 2017, issued by the German Patent Office in counterpart German Application No. 112014005260.4.

* cited by examiner

TERMINAL-ATTACHED ELECTRIC WIRE

TECHNICAL FIELD

The present invention relates to a terminal-attached electric wire in which a conductor-exposed portion of a terminal to which a conductor is connected is covered with resin.

BACKGROUND ART

Conventionally, in automobiles, home electronics appliances, etc., signal lines and power lines are used in which an electric wire having a core wire made of a copper material is connected to a terminal also made of a copper material. On the other hand, in the automobile industry, in consideration of influences on the environment, it is an important issue to increase the fuel efficiency by making vehicles lighter. For this reason, attention is now paid to electric wires in which aluminum which is lighter in weight than copper is used as a material of a core wire. However, aluminum is prone to electrolytic corrosion under the presence of water and copper ions. That is, there is a problem that if water enters a connection portion of an aluminum core wire and a copper terminal, the water turns into electrolytic liquid between the members made of the different metals and aluminum electrolytic corrosion is prone to occur because of a difference between the corrosion potentials of aluminum and copper. In view of this, a terminal-attached electric wire has been proposed that prevents occurrence of electric corrosion by covering a connection portion of an aluminum core wire and a copper terminal with resin (refer to Patent document 1, for example).

In the terminal-attached electric wire disclosed in Patent document 1, a terminal is crimped onto a conductor portion that is exposed by removing an insulation covering at an end portion of a covered wire. This terminal-attached electric wire is set in a molding die consisting of, for example, upper and lower dies and resin is injected into a cavity formed in the molding die. As a result, the conductor-exposed portion is covered with the resin at the connection portion of the conductor and the terminal. A resin portion is formed as a result of solidification of the resin.

PRIOR ART DOCUMENTS

Patent Documents

Patent document 1: JP-A-2001-167821

SUMMARY OF THE INVENTION

Problems to be Solved by the Invention

Incidentally, in the above conventional terminal-attached electric wire, to prevent electrolytic corrosion, it is necessary to bring the resin portion into close contact with the terminal. However, if the adhesion between the resin portion and the terminal is too strong in molding the resin portion, the resin portion is stuck to the molding die rather than the terminal, rendering the manufacture difficult. Therefore, it is necessary to weaken the adhesion between the resin portion and the terminal to some extent.

However, where the adhesion between the resin portion and the terminal is weakened, a contrary problem arises that the resin portion separates from the terminal when external force acts on the resin portion. In particular, there is a problem that in releasing the die from the terminal-attached electric wire after the molding of the resin portion, the resin portion separates from the terminal in a die release direction. As such, the above conventional technique lacks a countermeasure against the above problem.

The present invention has been made in the above circumstances, and an object of the invention is therefore to provide a terminal-attached electric wire capable of preventing separation of a resin portion from a terminal.

Means for Solving the Problems

The above object of the invention is attained by the following configurations:

(1) A terminal-attached electric wire comprising:
a conductor;
a terminal to which the conductor is connected; and
a resin portion which is formed by molding resin on a conductor-exposed portion of the terminal using a die and covers the conductor-exposed portion,
wherein the resin portion comprises a separation preventing portion which prevents the resin portion from separating in a release direction of the die when the die is released.

In the terminal-attached electric wire having the configuration of item (1), the resin portion has the separation preventing portion. As a result, even if force acts on the resin portion in a die release direction when the die is released, the resin portion is prevented from separation in the die release direction.

(2) The terminal-attached electric wire according to item (1), wherein the separation preventing portion is disposed in a tip-side portion where the terminal is provided.

In the terminal-attached electric wire having the configuration of item (2), the separation preventing portion is disposed in the tip-side portion of the resin portion. As a result, even if force acts on the resin portion in the die release direction, the resin portion is prevented from separation starting from its tip portion. Thus, the tip portion of the resin portion does not separate from the terminal.

(3) The terminal-attached electric wire according to item (2), wherein the separation preventing portion includes a tapered portion which is inclined toward a tip side of the resin portion.

In the terminal-attached electric wire having the configuration of item (3), immediately after die molding of the resin portion, the tapered portion is in close contact with an inner surface of the die. When the die is released in this state, the shearing adhesion force that acts on the resin portion is weaker than in a case that a tip-side end surface of a resin portion is parallel with the die release direction. Furthermore, since the separation preventing portion includes the tapered portion which is inclined toward the tip side of the resin portion, the portion to receive external force of the resin portion is made smaller. As a result, being unlikely to receive strong external force, the resin portion does not separate. Therefore, the resin portion can be prevented more reliably from separation from the terminal.

(4) The terminal-attached electric wire according to item (3), wherein the separation preventing portion includes tapered portions of plural stages.

In the terminal-attached electric wire having the configuration of item (4), since the separation preventing portion includes the tapered portions of plural stages, the tapered portion that covers the conductor-exposed portion and is inclined so as to face the tip side can be formed in a limited space of a tip portion of the resin portion.

Advantages of the Invention

The terminal-attached electric wires having the configurations of items (1) and (2) provide the advantages that even if force acts on the resin portion in the die release direction when the die is released, the resin portion is prevented from separation in the die release direction. Furthermore, from the viewpoint of a product, since the resin portion is provided with the separation preventing portion, only weak external force acts on the resin portion. This prevents the resin portion from separation from the bottom wall of the terminal and hence prevents entrance of water into the terminal.

In the terminal-attached electric wire having the configuration of item (3), when the die is released after die molding of the resin portion, the shearing adhesion force that acts on the resin portion is weaker than in a case that the tip-side end surface of a resin portion is parallel with the die release direction. Furthermore, since the tapered portion is formed in the tip portion of the resin portion and is inclined so as to face the tip side, the portion to receive external force of the resin portion is made smaller and hence the resin portion can be prevented from separating from the terminal. This provides an advantage that a terminal-attached electric wire can be provided in which the resin portion can be prevented more reliably from separating from the terminal.

In the terminal-attached electric wire having the configuration of item (4), since the peeling preventive portion includes the tapered portions of plural stages, the tapered portion that covers the conductor-exposed portion and is inclined so as to face the tip side can be formed in a limited space of a tip portion of the resin portion. That is, the tapered portion can be formed more easily. Therefore, in addition to the advantages of item (3), another advantage is provided that a terminal-attached electric wire can be provided in which the resin portion can be prevented from peeling off the terminal by forming the tapered portion more easily.

MODES FOR CARRYING OUT THE INVENTION

Figure 1:
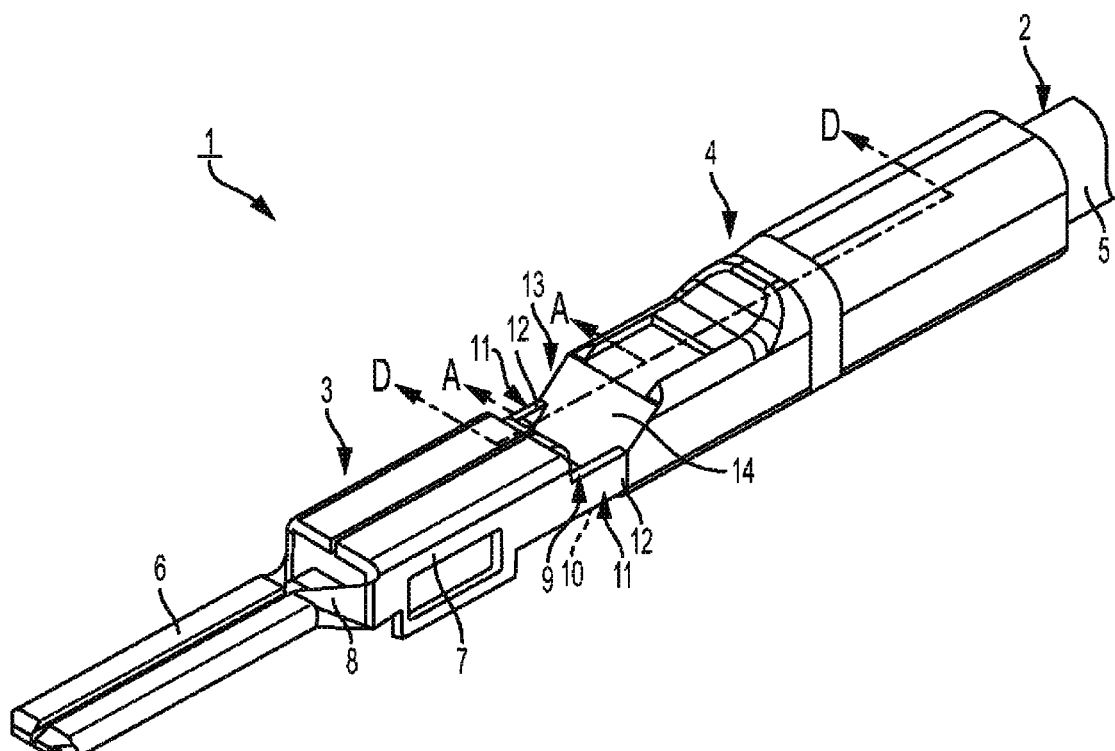
FIG. 1 is a perspective view of a terminal-attached electric wire according to an embodiment of the present invention.
Figure 2:
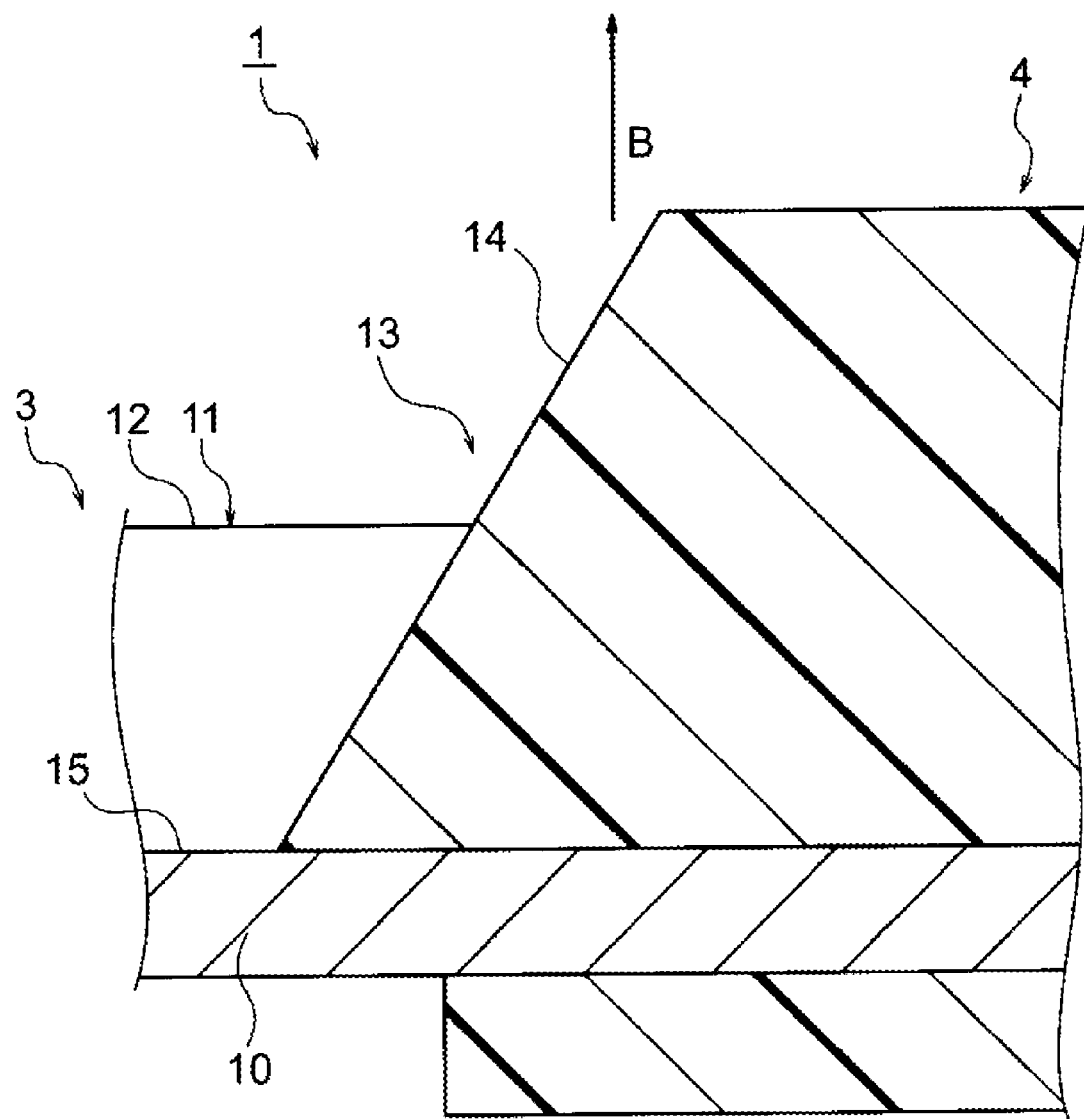
FIG. 2 is a sectional view taken along line A-A in FIG. 1.
Figure 3:
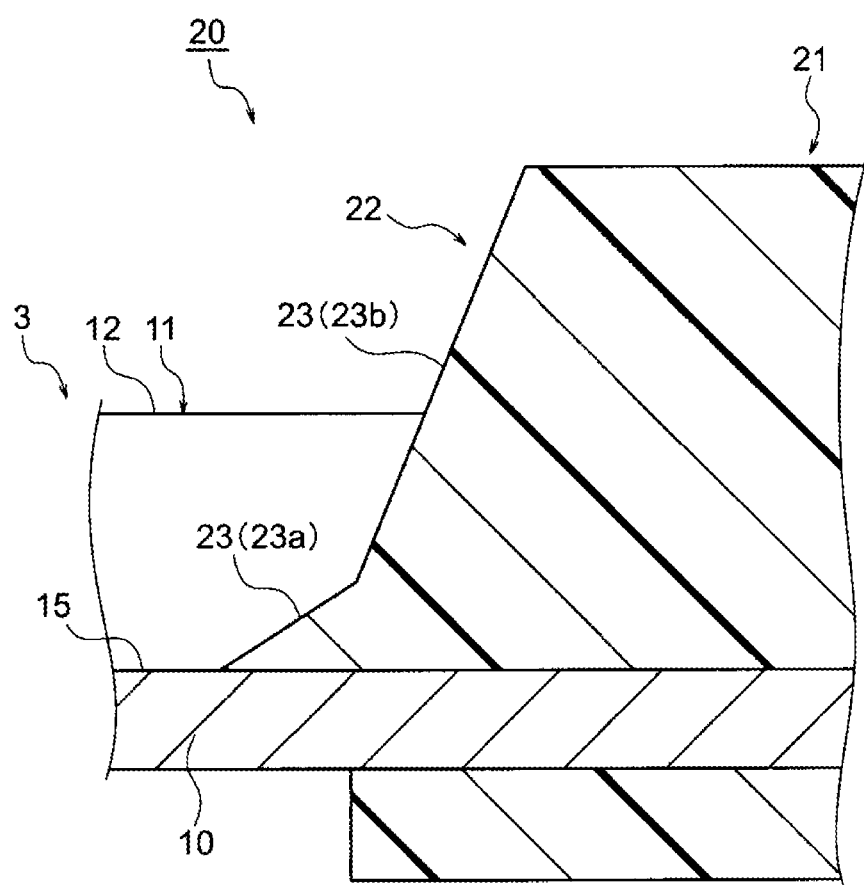
FIG. 3 is a sectional view of a terminal-attached electric wire according to a first modification of the invention.
Figure 4:
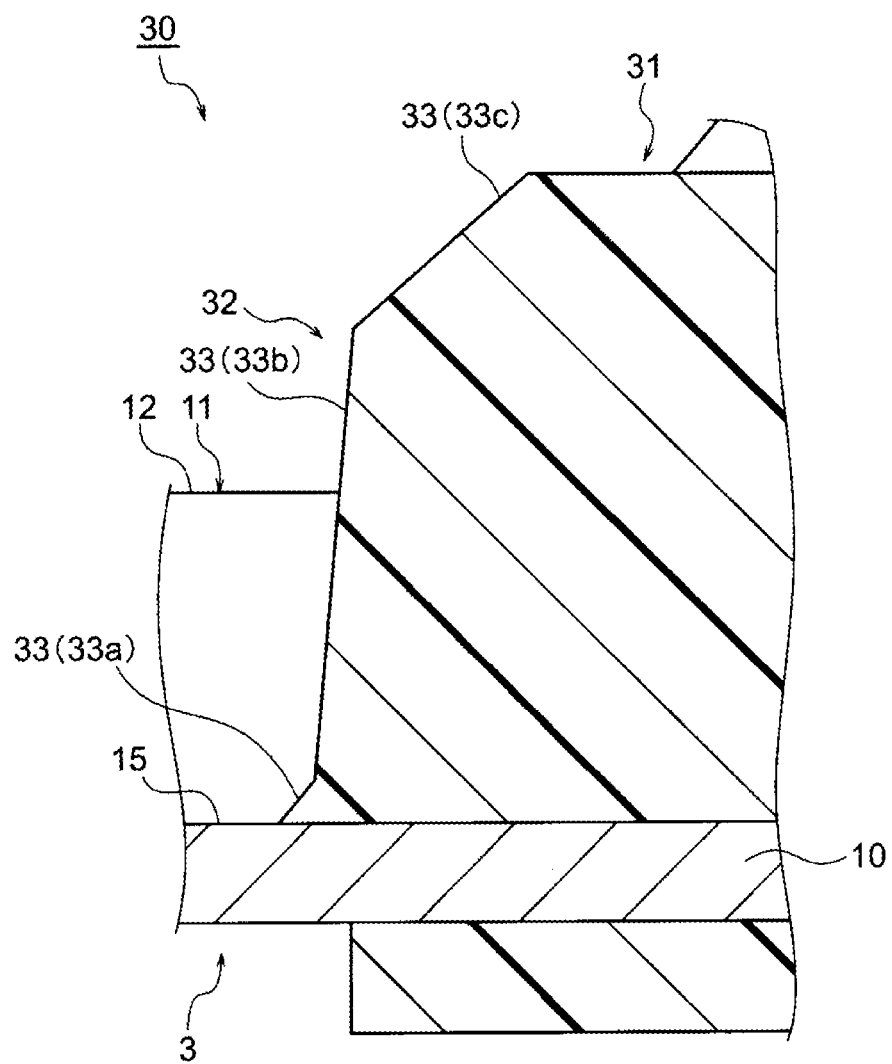
FIG. 4 is a sectional view of a terminal-attached electric wire according to a second modification of the invention.
Figure 5:
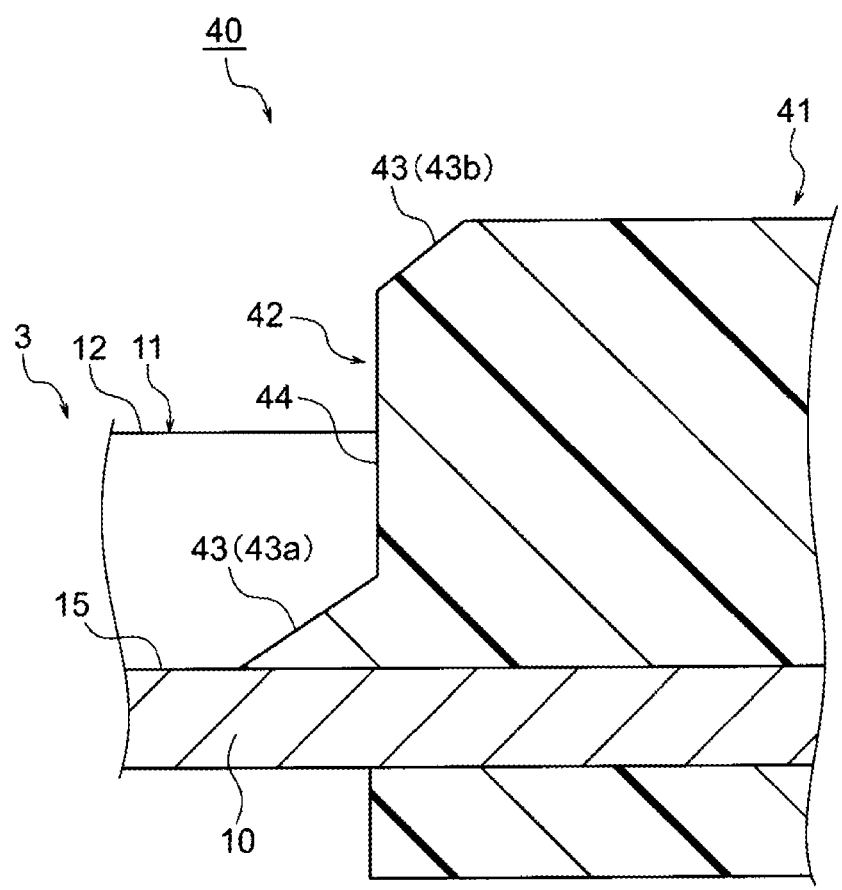
FIG. 5 is a sectional view of a terminal-attached electric wire according to a third modification of the invention.
Figure 6:
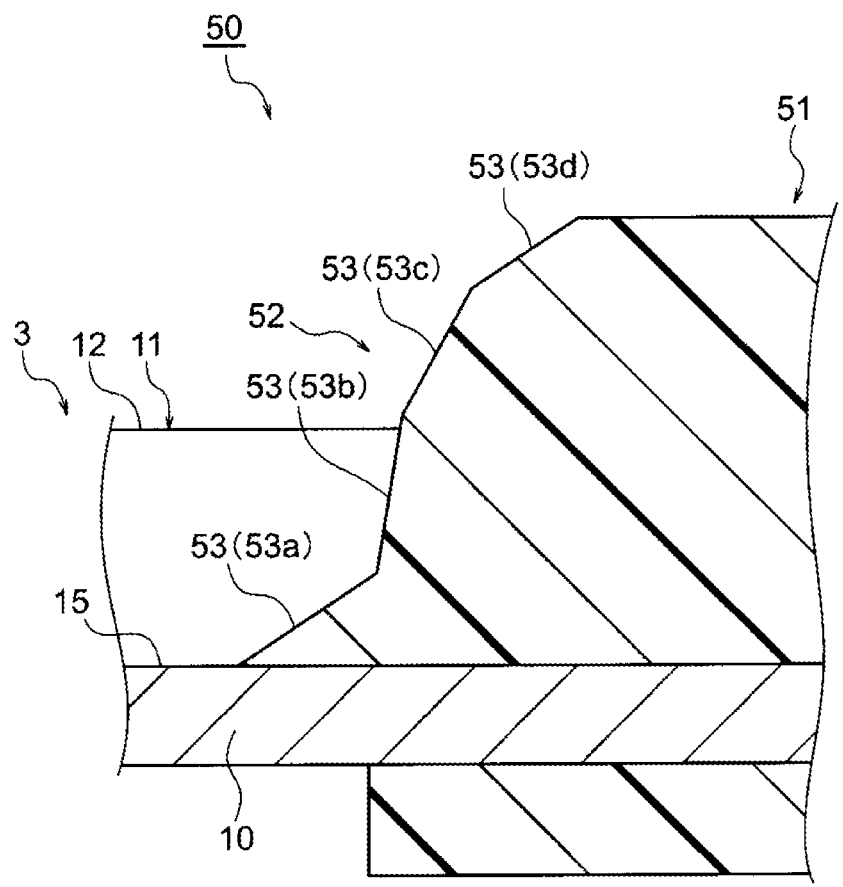
FIG. 6 is a sectional view of a terminal-attached electric wire according to a fourth modification of the invention.
Figure 7:
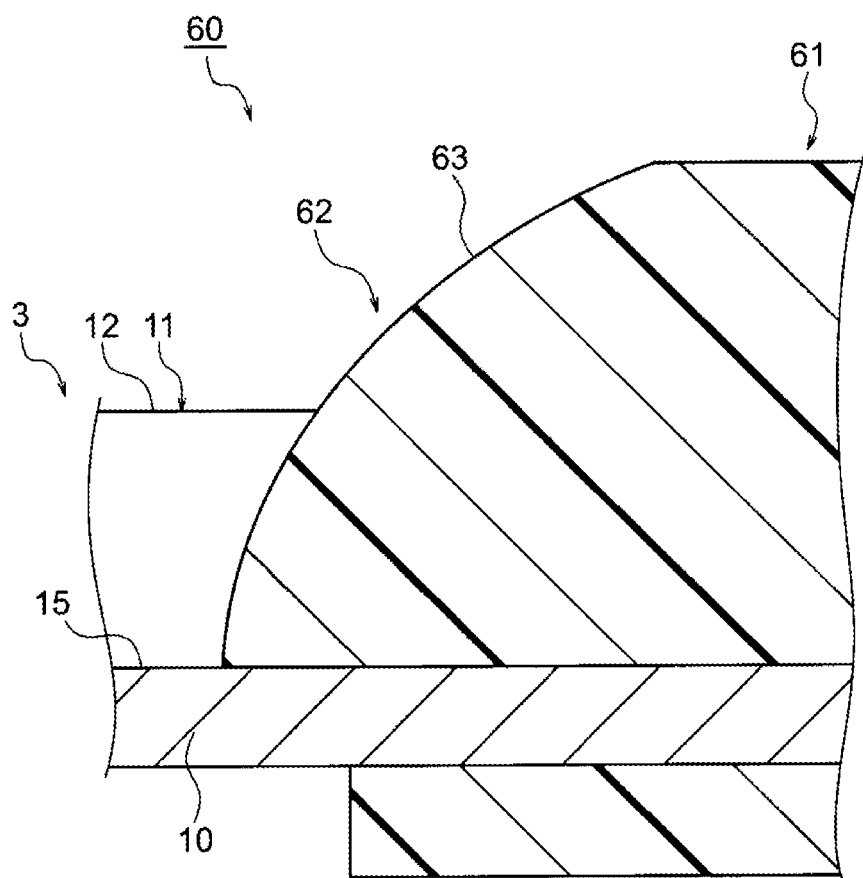
FIG. 7 is a sectional view of a terminal-attached electric wire according to a fifth modification of the invention.
Figure 8:
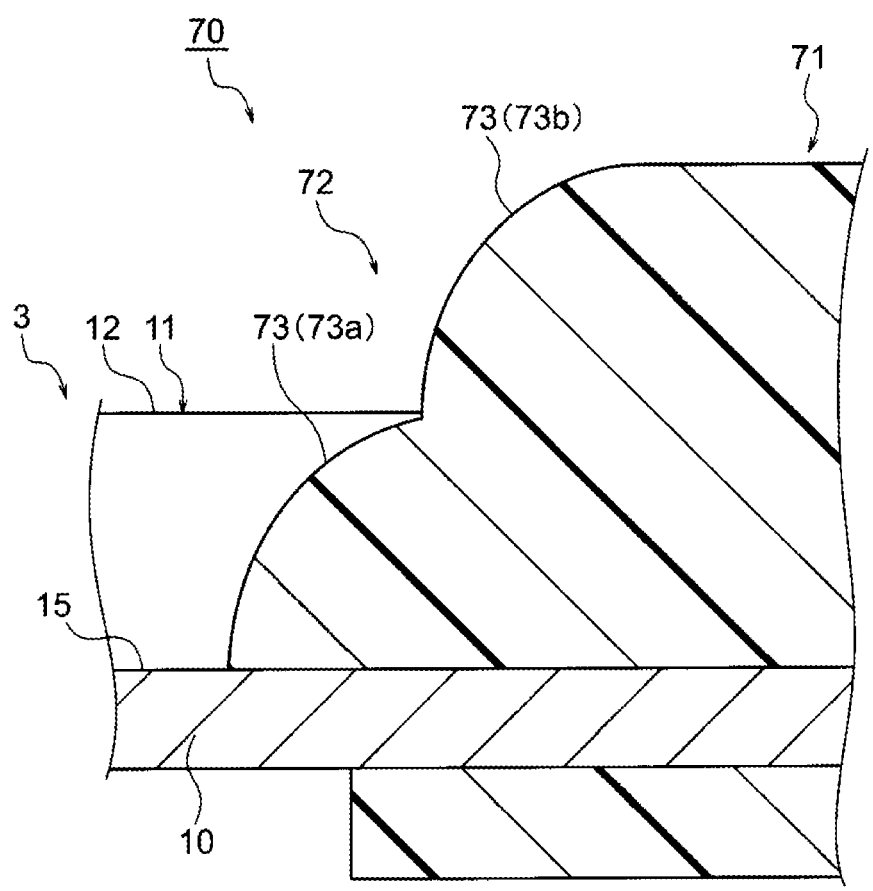
FIG. 8 is a sectional view of a terminal-attached electric wire according to a sixth modification of the invention.
Figure 9:
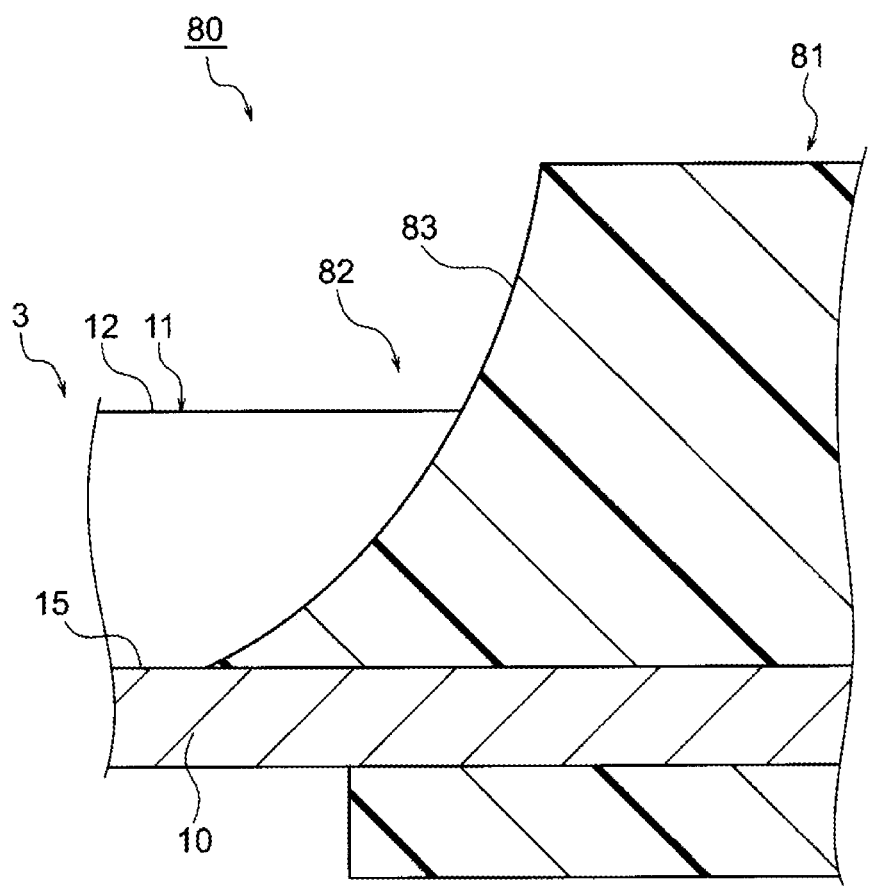
FIG. 9 is a sectional view of a terminal-attached electric wire according to a seventh modification of the invention.
Figure 10:
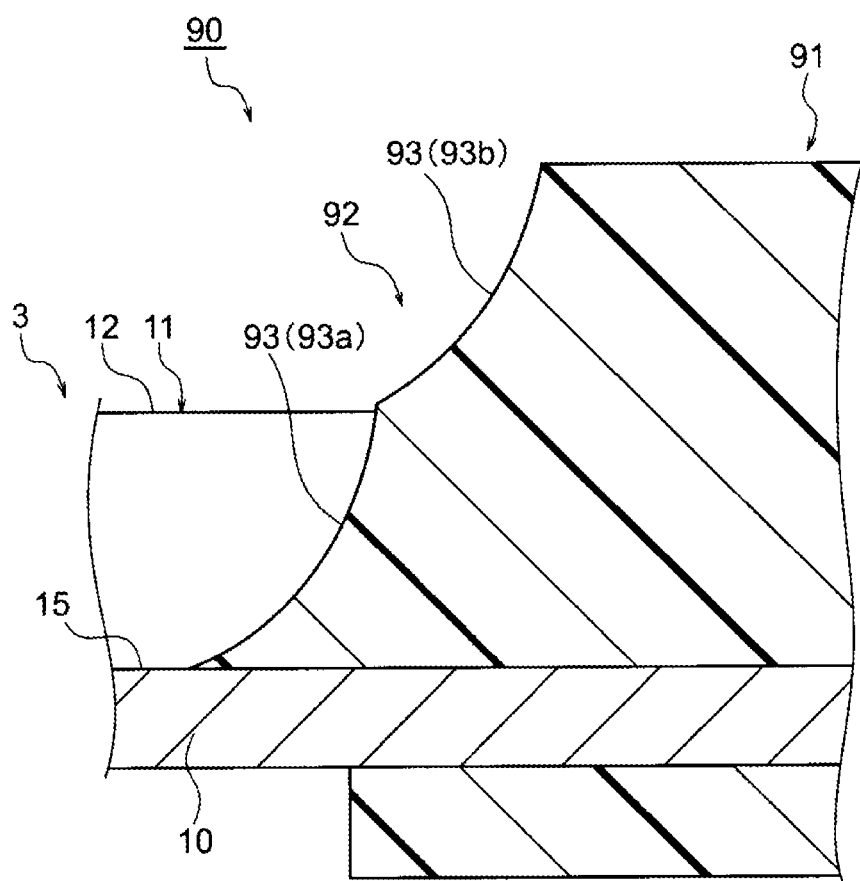
FIG. 10 is a sectional view of a terminal-attached electric wire according to an eighth modification of the invention.
Figure 11:
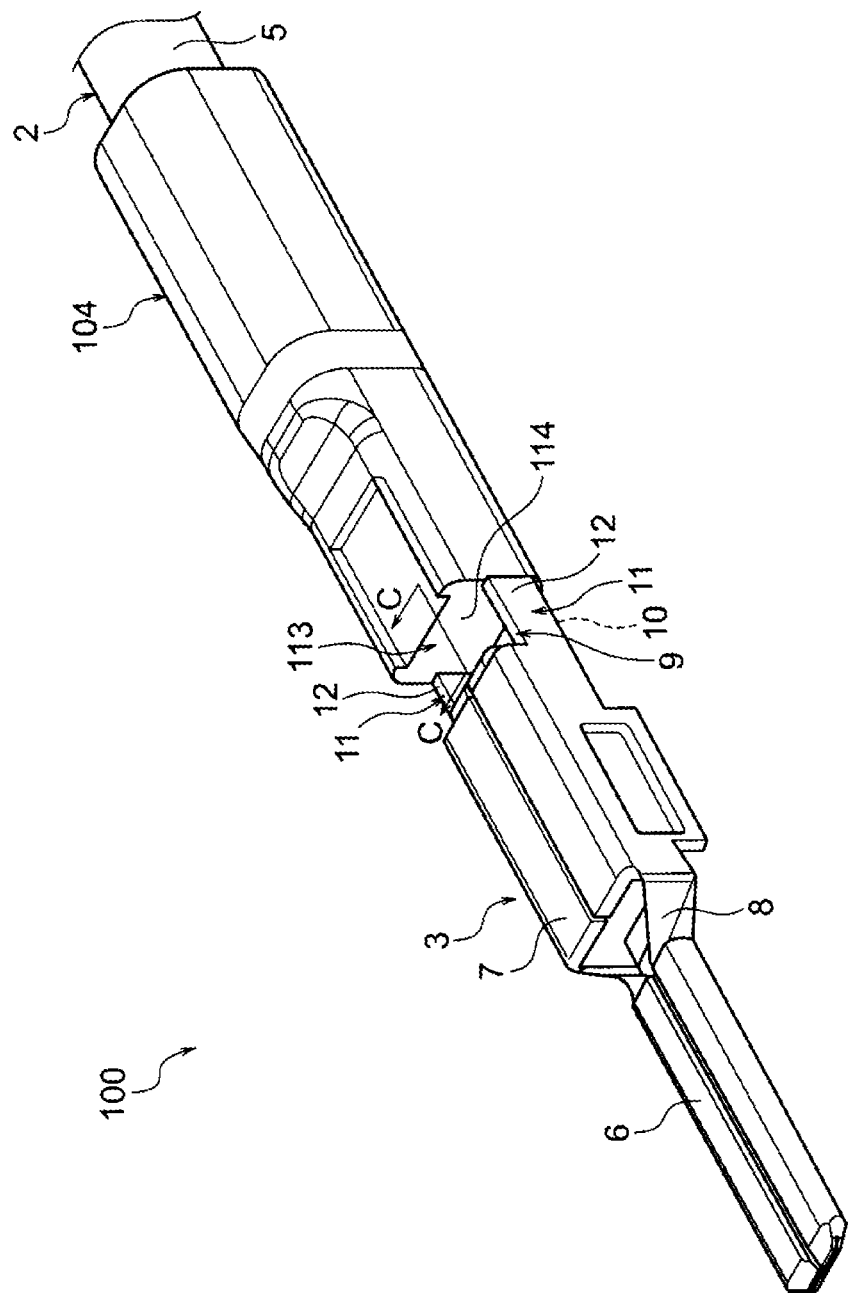
FIG. 11 illustrates an advantage of the invention.
Figure 12:
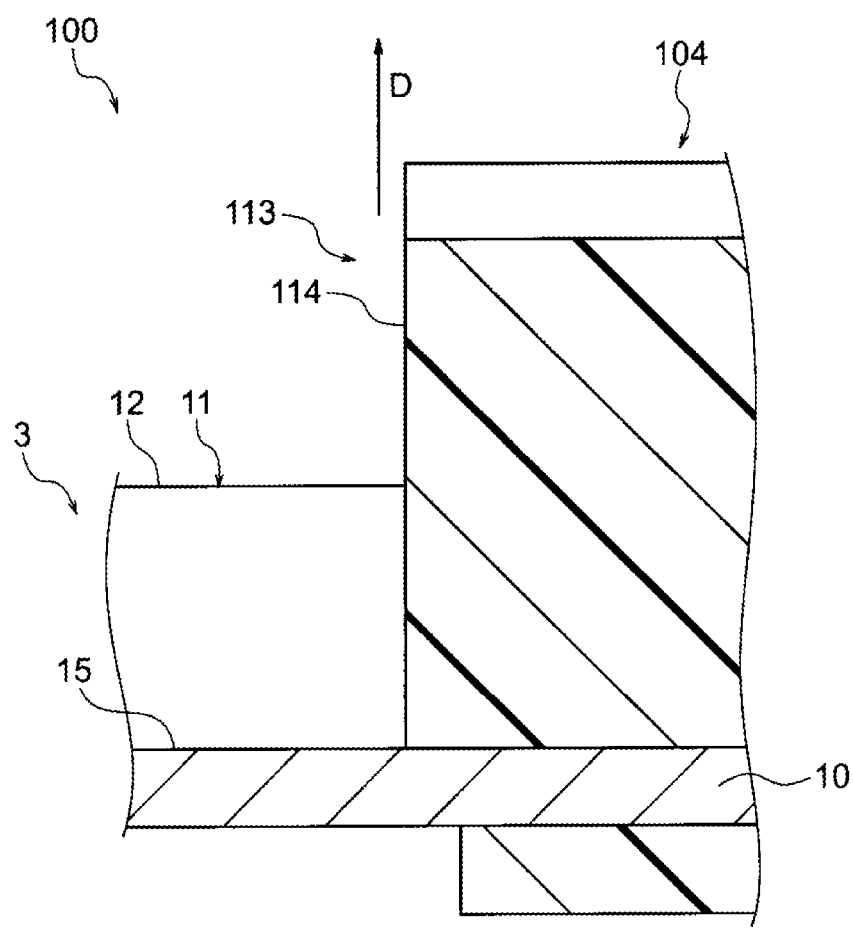
FIG. 12 is a sectional view taken along line C-C in FIG. 11.
Figure 13:
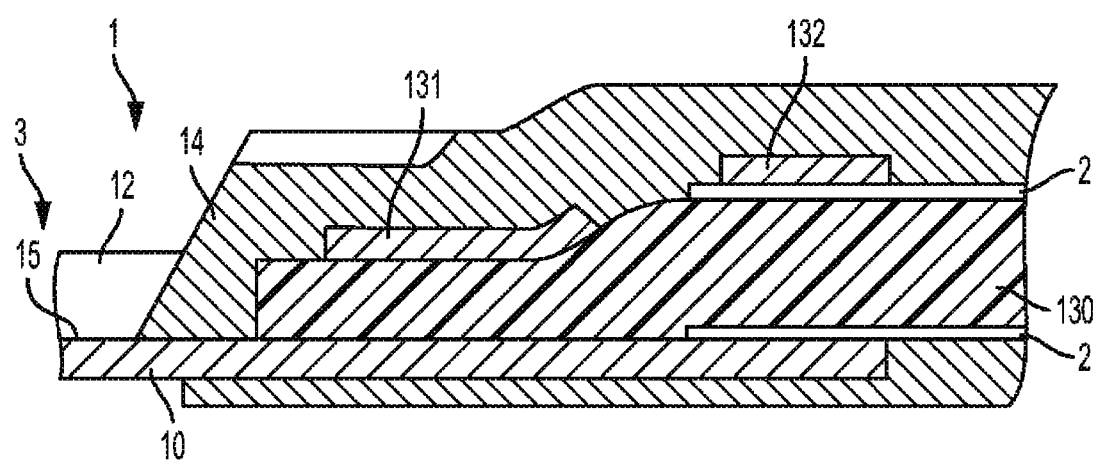
FIG. 13 is a sectional view taken along line D-D in FIG. 1.

An embodiment and modifications of the present invention will be hereinafter described with reference to FIGS. 1 to 13. FIG. 1 is a perspective view of a terminal-attached electric wire according to the embodiment of the invention. FIG. 2 is a sectional view taken along line A-A in FIG. 1. FIG. 3 is a sectional view of a terminal-attached electric wire according to a first modification of the invention. FIG. 4 is a sectional view of a terminal-attached electric wire according to a second modification of the invention. FIG. 5 is a sectional view of a terminal-attached electric wire according to a third modification of the invention. FIG. 6 is a sectional view of a terminal-attached electric wire according to a fourth modification of the invention. FIG. 7 is a sectional view of a terminal-attached electric wire according to a fifth modification of the invention. FIG. 8 is a sectional view of a terminal-attached electric wire according to a sixth modification of the invention. FIG. 9 is a sectional view of a terminal-attached electric wire according to a seventh modification of the invention. FIG. 10 is a sectional view of a terminal-attached electric wire according to an eighth modification of the invention. FIG. 11 illustrates an advantage of the invention. FIG. 12 is a sectional view taken along line C-C in FIG. 11. FIG. 13 is a sectional view taken along line D-D in FIG. 1.

As illustrated in FIG. 1, the terminal-attached electric wire 1 includes an electric wire 2, a terminal 3, and a resin portion 4. In the terminal-attached electric wire 1 according to the embodiment, the side in which the terminal 3 is provided is defined as a tip side and the side in which the electric wire 2 is provided is defined as a rear side. First, the individual members of the terminal-attached electric wire 1 will be described.

As illustrated in FIG. 13, the electric wire 2 includes a conductor 130 and an insulation covering that covers the conductor 130. The conductor 130 is produced by twisting aluminum wires together.

Referring FIG. 1, the terminal 3 is formed by pressing a copper pate. The terminal 3 used in the embodiment is a male terminal (just an example) to be press-fitted into a connector housing (not illustrated). The terminal 3 includes a terminal connection portion 6, a cylinder portion 7, a first connection 8, a second connection 9, and a wire connection portion (not illustrated).

The terminal connection portion 6, which has a long and straight shape, is a portion to be connected to a partner female terminal (not illustrated).

The cylinder portion 7 is disposed in the rear of the terminal connection portion 6, and is shaped approximately like a box that conforms to the shape of a terminal housing room (not illustrated) that is formed in the connector housing.

The first connection 8 is a portion that connects the terminal connection portion 6 and the cylinder portion 7. The first connection 8 is formed so as to increase in width as the position goes rearward.

The second connection 9 is a portion that connects the cylinder portion 7 and the wire connection portion. The second connection 9 has a bottom wall 10 and a pair of side walls 11 which are erected from the two respective side edges of the bottom wall 10. The bottom wall 10 and the pair of side walls 11 are continuous with the cylinder portion 7 and the wire connection portion.

The pair of side walls 11 has a pair of parallel side walls 12 and a pair of slant side walls (not illustrated). The pair of parallel side walls 12 are continuous with the rear end of the cylinder portion 7 and are shaped like band plates. The pair of parallel side walls 12 are opposed to each other so as to extend parallel with each other with a prescribed gap. The width of the combination of the pair of parallel side walls 12 is the same as that of the cylinder portion 7. The pair of slant side walls are continuous with the rear ends of the pair of parallel side walls 12 and the front end of the wire connection portion, and are shaped like band plates. The pair of slant side walls are formed so as to decrease in interval as the position goes rearward.

The wire connection portion is disposed in the rear of the second connection 9 so as to be continuous with its rear end. The wire connection portion is provided to electrically connect the electric wire 2 and the terminal 3. More specifically, as illustrated in FIG. 13, the electric wire 2 and the terminal 3 are electrically connected to each other by crimping (swaging) conductor swaging portions 131 and 132 of the wire connection portion onto the conductor 130 of the electric wire 2.

The resin portion 4 is provided to prevent electrolytic corrosion due to entrance of water into a connection portion of the conductor 130 of the electric wire 2 and the terminal 3 by covering a conductor-exposed portion (not illustrated) at the connection portion of the conductor 130 and the terminal 3. The resin portion 4 is formed so as to completely cover the outer circumferential surfaces of portions from the pair of slant side walls of the second connection 9 of the terminal 3 to a terminal portion of the electric wire 2.

As illustrated in FIGS. 1 and 2, a tip portion 13 of the resin portion 4 has a tapered portion (separation preventing portion) 14 which is formed with a single, flat tapered surface which is inclined so as to face the tip side. The number and shapes of tapered portions are just examples; as described later, tapered portions of plural stages may be formed. The shape of the tapered surface is not limited to a flat surface. A tip portion of the tapered portion 14 is formed so as to be in close contact with an inner surface 15 of the bottom wall 10. The tapered portion 14 is formed so as to form, with the inner surface 15 of the bottom wall 10, such an angle (tapered angle) that the resin portion 4 can cover the conductor-exposed portion, that is, no part of the conductor-exposed portion is exposed.

Although in the terminal-attached electric wire 1 illustrated in FIGS. 1 and 2 the resin portion 4 has the only one tapered portion 14, a terminal-attached electric wire 20 according to a first modification illustrated in FIG. 3 is possible in which a tip portion 22 of a resin portion 21 has a two-stage tapered portion 23. The terminal-attached electric wire 20 is the same in configuration as the terminal-attached electric wire 1 according to the embodiment except for the resin portion 21. Therefore, constituent members having the same ones in the embodiment are given the same reference numerals as the latter and will not be described in detail. This also applies to terminal-attached electric wires 30, 40, 50, 60, 70, 80, and 90 to be described later.

The tip portion 22 of the resin portion 21 has, as the tapered portion 23, a first tapered portion 23*a* and a second tapered portion 23*b* which are arranged in this order from the tip side. In the two-stage tapered portion 23, the first tapered portion 23*a* is located closest to the tip side. The first tapered portion 23*a* is formed so as to be in close contact with the inner surface 15 of the bottom wall 10. The second tapered portion 23*b* is continuous with the first tapered portion 23*a*. The tapered angle of the second tapered portion 23*b* is larger than that of the first tapered portion 23*a*. The two-stage tapered portion 23 is formed at such angles that the conductor-exposed portion can be covered, that is, no part of the conductor-exposed portion is exposed.

A terminal-attached electric wire 30 according to a second modification illustrated in FIG. 4 is possible in which a tip portion 32 of a resin portion 31 has a three-stage tapered portion 33. The tip portion 32 of the resin portion 31 has, as the tapered portion 33, a first tapered portion 33*a*, a second tapered portion 33*b*, and a third tapered portion 33*c* which are arranged in this order from the tip side. In the three-stage tapered portion 33, the first tapered portion 33*a* is located closest to the tip side. The first tapered portion 33*a* is formed so as to be in close contact with the inner surface 15 of the bottom wall 10. The second tapered portion 33*b* is continuous with the first tapered portion 33*a*. The tapered angle of the second tapered portion 33*b* is larger than that of the first tapered portion 33*a*. The third tapered portion 33*c* is continuous with the second tapered portion 33*b*. The tapered angle of the third tapered portion 33*c* is smaller than the tapered angles of the first tapered portion 33*a* and the second tapered portion 33*b*. The three-stage tapered portion 33 is formed at such angles that the conductor-exposed portion can be covered, that is, no part of the conductor-exposed portion is exposed.

A terminal-attached electric wire 40 according to a third modification illustrated in FIG. 5 is possible in which a tip portion 42 of a resin portion 41 has a two-stage tapered portion 43 and a vertical portion 44. Although in FIG. 5 the tapered portion 43 is formed in two stages, this aspect of the invention is not limited to this structure; the tapered portion 43 may be of three or more stages. The tip portion 42 has, as the tapered portion 43, a first tapered portion 43*a* and a second tapered portion 43*b* which are arranged in this order from the tip side. The first tapered portion 43*a* is formed so as to be in close contact with the inner surface 15 of the bottom wall 10. The vertical portion 44 is formed perpendicularly to the inner surface 15 of the bottom wall 10. The vertical portion 44 is continuous with the first tapered portion 43*a* and the second tapered portion 43*b*. The two-stage tapered portion 43 and the vertical portion 44 are formed at such angles that the conductor-exposed portion can be covered, that is, no part of the conductor-exposed portion is exposed.

A terminal-attached electric wire 50 according to a fourth modification illustrated in FIG. 6 is possible in which a tip portion 52 of a resin portion 51 has a four-stage tapered portion 53. The tip portion 52 has, as the tapered portion 53, a first tapered portion 53*a*, a second tapered portion 53*b*, a third tapered portion 53*c*, and a fourth tapered portion 53*d* which are arranged in this order from the tip side. In the four-stage tapered portion 53, the first tapered portion 53*a* is located closest to the tip side. The first tapered portion 53*a* is formed so as to be in close contact with the inner surface 15 of the bottom wall 10. The second tapered portion 53*b* is continuous with the first tapered portion 53*a*. The third tapered portion 53*c* is continuous with the second tapered portion 53*b*. The fourth tapered portion 53*d* is continuous with the third tapered portion 53*c*. The four-stage tapered portion 53 is formed at such angles that the conductor-exposed portion can be covered, that is, no part of the conductor-exposed portion is exposed. Although in FIG. 6 the tapered portion 53 is formed in four stages, this aspect of the invention is not limited to this structure; the tapered portion 53 may be of five or more stages.

A terminal-attached electric wire 60 according to a fifth modification illustrated in FIG. 7 is possible in which a tip portion 62 of a resin portion 61 has a single, convex tapered portion 63 which is inclined so as to face the tip side and to have a parabolic sectional shape. The number of tapered portions is just an example; as described later, tapered portions of plural stages may be formed. A tip portion of the tapered portion 63 is formed so as to be in close contact with the inner surface 15 of the bottom wall 10. The tapered portion 63 is inclined so that the resin portion 61 can cover the conductor-exposed portion, that is, no part of the conductor-exposed portion is exposed.

A terminal-attached electric wire 70 according to a sixth modification illustrated in FIG. 8 is possible in which a tip portion 72 of a resin portion 71 has a two-stage, convex tapered portion 73 which is inclined so as to face the tip side and to have a parabolic sectional shape. The number of tapered portions is just an example; tapered portions of three or more stages may be formed. The tip portion 72 of the resin portion 71 has, as the tapered portion 73, a first tapered portion 73*a* and a second tapered portion 73*b* which are arranged in this order from the tip side. In the two-stage tapered portion 73, the first tapered portion 73*a* is located closest to the tip side. The first tapered portion 73*a* is formed so as to be in close contact with the inner surface 15 of the bottom wall 10. The second tapered portion 73*b* is continuous with the first tapered portion 73*a*. The two-stage tapered portion 73 is inclined so that the resin portion 71 can cover the conductor-exposed portion, that is, no part of the conductor-exposed portion is exposed.

A terminal-attached electric wire 80 according to a seventh modification illustrated in FIG. 9 is possible in which a tip portion 82 of a resin portion 81 has a single tapered portion 83 which is inclined so as to face the tip side and to have a concave surface. The number of tapered portions is just an example; as described later, tapered portions of plural stages may be formed. A tip portion of the tapered portion 83 is formed so as to be in close contact with the inner surface 15 of the bottom wall 10. The tapered portion 83 is inclined so that the resin portion 81 can cover the conductor-exposed portion, that is, no part of the conductor-exposed portion is exposed.

A terminal-attached electric wire 90 according to an eighth modification illustrated in FIG. 10 is possible in which a tip portion 92 of a resin portion 91 has a two-stage tapered portion 93 which is inclined so as to face the tip side and to have concave surfaces. The number of tapered portions is just an example; tapered portions of three or more stages may be formed. The tip portion 92 of the resin portion 91 has, as the tapered portion 93, a first tapered portion 93*a* and a second tapered portion 93*b* which are arranged in this order from the tip side. In the two-stage tapered portion 93, the first tapered portion 93*a* is located closest to the tip side. The first tapered portion 93*a* is formed so as to be in close contact with the inner surface 15 of the bottom wall 10. The second tapered portion 93*b* is continuous with the first tapered portion 93*a*. The two-stage tapered portion 93 is inclined so that the resin portion 91 can cover the conductor-exposed portion, that is, no part of the conductor-exposed portion is exposed.

Next, returning to FIG. 1, a manufacturing method of the terminal-attached electric wire 1 according to the embodiment will be described.

First, an electric wire 2 and a terminal 3 are electrically connected to each other. Then the electric wire 2 which is connected to the terminal 3 is set in a die (not illustrated) consisting of upper and lower dies. Then resin is injected into a cavity of the die. As a result, the outer circumferential surfaces of portions from the pair of slant side walls of the second connection 9 of the terminal 3 to a terminal portion of the electric wire 2 are completely covered with the resin. That is, the conductor-exposed portion of the terminal 3 to which the conductor is connected is covered with the resin. Then the resin solidifies, whereby a resin portion 4 is formed and a terminal-attached electric wire 1 is completed as illustrated in FIG. 1.

Subsequently, the die is released in the direction indicated by arrow B in FIG. 2. As a result, force (external force) acts on the resin portion 4 in such a direction as to separate the resin portion 4 (die release direction B). Thus, the resin portion 4 is forced to separate in the direction indicated by arrow B.

Incidentally, immediately after the die molding of the resin portion 4, an inner surface of the die is in close contact with the tapered portion 14 in a tip portion of the resin portion 4. When the die is released in the direction indicated by arrow B in this state, the shearing adhesion force that acts on the resin portion 4 is weaker than in a case of a terminal-attached electric wire 100 (see FIGS. 11 and 12; described later) in which the tip-side end surface of a resin portion 104 is parallel with a die release direction D (i.e., approximately perpendicular to the inner surface 15 of the bottom wall 10). Therefore, the force of lifting up the resin portion 4 in the die release direction B that results from the shearing adhesion force acting on the resin portion 4 does not surpass the adhesion between the resin portion 4 and the inner surface 15 of the bottom wall 10 of the terminal 3. Thus, the resin portion 4 does not separate from the terminal 3.

Now, referring to FIGS. 11 and 12, a description will be made of the terminal-attached electric wire that is configured in such a manner that a tip portion 113 of the resin portion does not have a tapered portion that is inclined so as to face the tip side.

As illustrated in FIGS. 11 and 12, the resin portion 104 is formed in the terminal-attached electric wire 100. The terminal-attached electric wire 100 is the same in configuration as the terminal-attached electric wire 1 according to the embodiment except for the resin portion 104. Therefore, constituent members having the same ones in the embodiment are given the same reference numerals as the latter and will not be described in detail. In the terminal-attached electric wire 100, the side in which the terminal 3 is provided is defined as a tip side and the side in which the electric wire 2 is provided is defined as a rear side.

In the terminal-attached electric wire 100, a vertical portion 114 is formed in a tip portion of the resin portion 104. The vertical portion 114 is formed parallel with the die release direction indicated by arrow D in FIG. 12, that is, approximately perpendicularly to the inner surface 15 of the bottom wall 10. Immediately after die molding of the resin portion 104, an inner surface of the die is in close contact with the vertical portion 114 in the tip portion of the resin portion 104. When the die is released in the direction indicated by arrow D in this state, the force of lifting up the resin portion 4 in the die release direction D that results from the shearing adhesion force acting on the resin portion 104 surpasses the adhesion between the resin portion 104 and the inner surface 15 of the bottom wall 10. Thus, the resin portion 104 separates from the terminal 3.

Returning to FIGS. 1 and 2, in the embodiment, since the tapered portion 14 is formed in a tip portion of the resin portion 4, the portion that receives external force is smaller than in the terminal-attached electric wire 100 illustrated in FIGS. 11 and 12. As a result, in the embodiment, only weaker external force acts on the resin portion 4 as compared to the case of the terminal-attached electric wire 100. It is therefore possible to prevent the resin portion 4 from separating from the bottom wall 10 of the terminal 3 and hence to prevent entrance of water into the terminal 3.

Referring to FIGS. 1 and 2, it is necessary that the resin portion 4 be formed so as to cover the conductor-exposed portion. Therefore, if a tapered portion were formed simply so as to face the tip side, the conductor-exposed portion might not be covered completely by the resin portion 4 to expose part of the conductor-exposed portion. In contrast, in the embodiment, the tapered portion 14 is formed so as to be inclined at such an angle that the conductor-exposed portion can be covered. Therefore, although the tapered portion 14 is formed, there is no probability that any part of the conductor-exposed portion is exposed. Furthermore, referring to FIGS. 7 and 9, since each of the tapered portions 63 and 83 is formed so that the conductor-exposed portion can be covered, there is no probability that any part of the conductor-exposed portion is exposed.

Still further, referring to FIGS. 3 to 6, 8, and 10, by forming the tapered portions of plural stages, a tapered portion that is inclined so as to face the tip side can be formed while the conductor-exposed portion is covered, even in a limited space of a tip portion of the resin portion. Therefore, although the tapered portions of plural stages are formed, there is no probability that any part of the conductor-exposed portion is exposed.

As is understood from the above description, in the terminal-attached electric wire 1 (20, 30, 40, 50, 60, 70, 80, or 90) according to the embodiment, even if separating force acts on the resin portion 4 (21, 31, 41, 51, 61, 71, 81, or 91) in the die release direction in releasing the die, the resin portion 4 (21, 31, 41, 51, 61, 71, 81, or 91) can be prevented from separating in the die release direction. Thus, a terminal-attached electric wire 1 (20, 30, 40, 50, 60, 70, 80, or 90) can be provided in which the resin portion 4 (21, 31, 41, 51, 61, 71, 81, or 91) can be prevented from separating from the terminal 3. Furthermore, from the viewpoint of a product, since the resin portion 4 (21, 31, 41, 51, 61, 71, 81, or 91) is provided with the separation preventing portion, strong external force hardly acts on the resin portion 4 (21, 31, 41, 51, 61, 71, 81, or 91). It is therefore possible to prevent the resin portion 4 (21, 31, 41, 51, 61, 71, 81, or 91) from separating from the bottom wall 10 of the terminal 3 and hence to prevent entrance of water into the terminal 3.

In the terminal-attached electric wire 1 (20, 30, 40, 50, 60, 70, 80, or 90) according to the embodiment, when the die is released after die molding of the resin portion 4 (21, 31, 41, 51, 61, 71, 81, or 91), the shearing adhesion force that acts on the resin portion 4 (21, 31, 41, 51, 61, 71, 81, or 91) is weaker than in a case that the tip-side end surface of a resin portion 4 (21, 31, 41, 51, 61, 71, 81, or 91) is parallel with the die release direction. Furthermore, since the tapered portion 14 (23, 33, 43, 53, 63, 73, 83, or 93) that is inclined so as to face the tip side is formed in a tip portion of the resin portion 4 (21, 31, 41, 51, 61, 71, 81, or 91), the portion to receive external force of the resin portion 4 (21, 31, 41, 51, 61, 71, 81, or 91) is made smaller. As a result, strong external force hardy acts on the resin portion 4 (21, 31, 41, 51, 61, 71, 81, or 91). It is therefore possible to prevent the resin portion 4 (21, 31, 41, 51, 61, 71, 81, or 91) from separating from the terminal 3. Thus, a terminal-attached electric wire 1 (20, 30, 40, 50, 60, 70, 80, or 90) can be provided in which the resin portion 4 (21, 31, 41, 51, 61, 71, 81, or 91) can be prevented more reliably from separating from the terminal 3.

Furthermore, in the terminal-attached electric wire 20 (30, 40, 50, 70, or 90) according to the embodiment, by forming the tapered portions of plural stages, the tapered portion that is inclined so as to face the tip side can be formed while the conductor-exposed portion is covered, even in a limited space of a tip portion of the resin portion 21 (31, 41, 51, 71, or 91). That is, the tapered portion can be formed more easily. Therefore, in addition to the above advantages, another advantage is provided that a terminal-attached electric wire 20 (30, 40, 50, 70, or 90) can be provided in which the resin portion 21 (31, 41, 51, 71, or 91) can be prevented from separating from the terminal 3 by forming the tapered portion more easily.

The features of the above-described terminal-attached electric wires according to the embodiment and the modifications of the invention will be summarized below in the form of items [1] to [4]:

[1] A terminal-attached electric wire (1, 20, 30, 40, 50, 60, 70, 80, 90) comprising:
a conductor;
a terminal (3) to which the conductor is connected; and
a resin portion (4, 21, 31, 41, 51, 61, 71, 81, 91) which is formed by molding resin on a conductor-exposed portion of the terminal (3) using a die and covers the conductor-exposed portion,
wherein the resin portion (4, 21, 31, 41, 51, 61, 71, 81, 91) comprises a separation preventing portion which prevents the resin portion from separating in a release direction of the die when the die is released.

[2] The terminal-attached electric wire (1, 20, 30, 40, 50, 60, 70, 80, 90) according to item [1], wherein the separation preventing portion is disposed in a tip-side portion where the terminal is provided.

[3] The terminal-attached electric wire (1, 20, 30, 40, 50, 60, 70, 80, 90) according to item [2], wherein the separation preventing portion includes a tapered portion (14, 23, 33, 43, 53, 63, 73, 83, or 93) which is inclined toward a tip side of the resin portion.

[4] The terminal-attached electric wire (20, 30, 40, 50, 70, 90) according to item [3], wherein the separation preventing portion includes tapered portions of plural stages.

Although the invention has been described in detail by referring to the particular modes of implementation, it is apparent to those skilled in the art that various changes and modifications are possible without departing from the spirit and scope of the invention.

The present application is based on Japanese Patent Application No. 2013-238419 filed on Nov. 19, 2013, the disclosure of which is incorporated herein by reference.

INDUSTRIAL APPLICABILITY

The invention provides an advantage that a terminal-attached electric wire capable of preventing separating of a resin portion from a terminal. Providing this advantage, the invention is useful when applied to terminal-attached electric wires in which a conductor-exposed portion of a terminal to which a conductor is connected is covered with resin.

DESCRIPTION OF SYMBOLS

1, 20, 30, 40, 50, 60, 70, 80, 90: Terminal-attached electric wire
2: Electric wire
3: Terminal
4, 21, 31, 41, 51, 61, 71, 81, 91: Resin portion
5: Insulation covering
6: Terminal connection portion
7: Cylinder portion
8: First connection
9: Second connection
10: Bottom wall
11: Side wall
12: Parallel side wall
13, 22, 32, 42, 52, 62, 72, 82, 92: Tip portion
14: Tapered portion

15: Inner surface
23: Tapered portion
23a: First tapered portion
23b: Second tapered portion
33: Tapered portion
33a: First tapered portion
33b: Second tapered portion
33c: Third tapered portion
43: Tapered portion
43a: First tapered portion
43b: Second tapered portion
44: Vertical portion
53: Tapered portion
53a: First tapered portion
53b: Second tapered portion
53c: Third tapered portion
53d: Fourth tapered portion
63: Tapered portion
73: Tapered portion
73a: First tapered portion
73b: Second tapered portion
83: Tapered portion
93: Tapered portion
93a: First tapered portion
93b: Second tapered portion

The invention claimed is:

1. A terminal-attached electric wire comprising:
a conductor;
a terminal to which the conductor is connected; and
a resin portion which is formed by molding resin on a conductor-exposed portion of the terminal using a die and covers the conductor-exposed portion,
wherein the resin portion comprises a separation preventing portion which prevents the resin portion from separating in a release direction of the die when the die is released,
wherein the separation preventing portion is disposed in a tip-side portion where the terminal is provided,
wherein the separation preventing portion includes a first tapered face which rises from an inner surface of a bottom wall of the terminal and which is inclined by a first tapered angle with respect to the bottom wall of the terminal, the first tapered angle being acute angle, and
wherein the separation preventing portion includes a second tapered face which is continuous with the first tapered face and which is inclined by a second tapered angle with respect to the bottom wall of the terminal, the second tapered angle being larger than the first tapered angle.

2. The terminal-attached electric wire according to claim 1, wherein the separation preventing portion includes a third tapered face which is continuous with the second tapered face and which is inclined by a third tapered angle with respect to the bottom wall of the terminal, the third tapered angle being smaller than both of the first tapered angle and the second tapered angle.

* * * * *